United States Patent [19]

Tanaka et al.

[11] 4,155,847

[45] May 22, 1979

[54] CATIONIC POLYMER FLOCCULANT PREPARED BY REACTING EPICHLOROHYDRIN AND A MANNICH REACTION PRODUCT

[75] Inventors: Katsutoshi Tanaka; Hisao Takeda; Mutsumi Kawano, all of Kanagawa; Isao Miyahara, Koza, all of Japan

[73] Assignees: Mitsubishi Chemical Industries, Ltd.; Kyoritsu Yuki Co., Ltd., both of Tokyo, Japan

[21] Appl. No.: 932,612

[22] Filed: Aug. 10, 1978

[30] Foreign Application Priority Data

Aug. 24, 1977 [JP] Japan .................. 52-101208

[51] Int. Cl.$^2$ .................. C02B 1/20; C02C 1/40; C08G 8/16; C08G 14/06
[52] U.S. Cl. .................. 210/54; 260/29.3; 260/844; 528/135; 528/149; 528/162; 528/163
[58] Field of Search .............. 528/135, 149, 162, 163; 210/54 A, 54 C; 260/29.3

[56] References Cited

U.S. PATENT DOCUMENTS

| | | | |
|---|---|---|---|
| 2,114,122 | 4/1938 | Bruson | 528/162 X |
| 2,636,019 | 4/1953 | Butler et al. | 528/162 X |
| 2,807,594 | 9/1957 | Haagen | 528/162 X |
| 3,166,516 | 1/1965 | Kirkpatrick et al. | 528/135 X |
| 3,169,118 | 2/1965 | Kirkpatrick et al. | 528/135 X |
| 3,436,373 | 4/1969 | Cox et al. | 528/135 |
| 3,567,659 | 3/1971 | Nagy | 210/54 X |
| 3,738,945 | 6/1973 | Panzer et al. | 210/54 X |
| 3,855,299 | 12/1974 | Witt | 210/54 C X |
| 4,093,542 | 6/1978 | Dahmen et al. | 210/54 C |
| 4,113,685 | 9/1978 | Hubner et al. | 210/54 C |

FOREIGN PATENT DOCUMENTS

| | | |
|---|---|---|
| 38-20741 | 10/1963 | Japan. |
| 38-26794 | 12/1963 | Japan. |
| 41-17965 | 10/1966 | Japan. |
| 49-37440 | 10/1974 | Japan. |
| 51-22471 | 7/1976 | Japan. |

OTHER PUBLICATIONS

Handbook of Epoxy Resins (1967), Lee et al., pp. 9-3.

*Primary Examiner*—Howard E. Schain
*Attorney, Agent, or Firm*—Lane, Aitken & Ziems

[57] ABSTRACT

New cationic flocculants are prepared by polycondensation of an epihalohydrin and Mannich reaction products of phenol, formaldehyde, and dialkylamine. The flocculants are useful for flocculation of various kinds of suspension such as various industrial waste waters, pulp slurry in paper making and the like.

10 Claims, No Drawings

CATIONIC POLYMER FLOCCULANT PREPARED BY REACTING EPICHLOROHYDRIN AND A MANNICH REACTION PRODUCT

BACKGROUND OF THE INVENTION

This invention relates to novel cationic polymer compounds. More particularly, it relates to cationic polymer compounds, useful as flocculant, which comprise as their principal component polycondensates to phenols having at least one dialkylaminomethyl substituent in the nucleus thereof and epihalohydrins.

A variety of flocculants have been now developed and used for removal of fine suspended particles or colloidal particles from effluent derived from various industries or in papermaking processes. Most of them are inorganic flocculants including aluminum sulfate, polyaluminum chloride, ferrous sulfate, ferric chloride and the like. These inorganic flocculants are advantageously inexpensive in cost but involve a number of disadvantages: In general, they have to be used in large amount; The sludge after concentration and dewatering contains large amount of metal oxide and hence the volume of the sludge becomes great; and where the sludge is subjected to further treatment such as burning, large amount of ashes are undesirably produced, presenting another problem of treating such ashes.

In order to overcome these disadvantages of the inorganic coagulants, a number of studies of organic flocculants have been made intensively. As a typical example of organic polycationic flocculants there are known polycondensates of epihalohydrins with amines including, for example, a polycondensate of epichlorohydrin and ammonia (Japanese Patent Publication No. 38-26794), polycondensates of alkylenediamines and epichlorohydrin (Japanese Patent Publication No. 41-17965), polycondensates of polyalkylenepolyamines and epihalohydrins (Japanese Patent Publication No. 38-20741), polycondensates of primary amines and epichlorohydrin (U.S. Pat. No. 3,567,659), polycondensates of secondary amines and epichlorohydrin (Japanese Patent Publication Nos. 49-37440 and 51-22471 and U.S. Pat. No. 3,738,945), and the like. However, these flocculants are low in molecular weight and have thus drawbacks that the ability of flocculating and settling fine suspended particles is poor and that they are consumed in large amount to achieve desired levels of flocculation. In addition, some of them are expensive.

SUMMARY OF THE INVENTION

It is therefore an object of the present invention to provide novel cationic polymer compounds excellent as flocculants.

The novel cationic polymer compounds according to the invention are water-soluble polycondensates of epihalohydrins and amines. The amines useful in the present invention are primarily those expressed by the following formula (I)

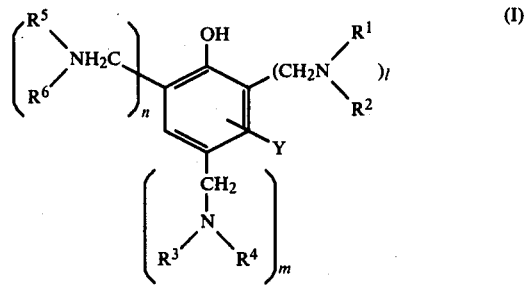

(wherein Y represents a hydrogen or a lower alkyl; $R^1$, $R^2$, $R^3$, $R^4$, $R^5$ and $R^6$ are the same or different lower alkyl; l, m and n are 0 or 1 respectively, proviso that l, m and n are not 0 at the same time;)

Amines other than those expressed by the above formula may be added as will be described hereinlater.

DETAILED DESCRIPTION OF THE INVENTION

The present invention will be described in detail.

The compounds expressed by the general formula (I) can be produced, as described in Organic Reactions Vol. I (Published by John Wiley & Sons in 1942), pages 303–341, by the Mannich reaction of phenol or its derivatives having a lower alkyl radical in the nucleus thereof such as cresol with formaldehyde and dialkyamines. Since monohydric phenols have the maximum three active hydrogen atoms therein, 1 mole of the phenol can react with up to 3 moles of formaldehyde and dialkylamine according to the Mannich reaction. By the Mannich reaction, mono-, di- and tri-substituted derivatives as expressed by the following formulae can be obtained depending on the molar ratio of formaldehyde-dialkylamine to phenols on reaction.

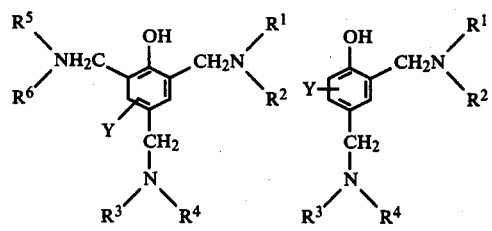

(II)    (IIIa)

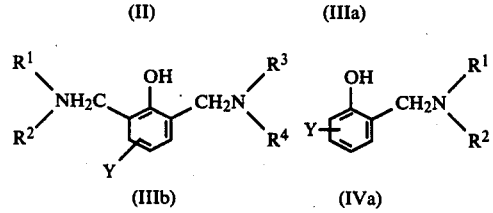

(IIIb)    (IVa)

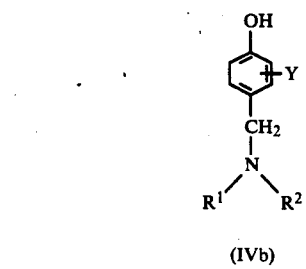

(IVb)

(wherein each $R^1$, ~$R^6$, and each Y have the same meanings as defined in formula (I)).

Formaldehyde and a dialkylamine are each used in an amount of one mole to three moles per mole of the monohydric phenol. The choice of the molar ratio within the above range depends on the type of a final Mannich reaction product desired. In this connection, however, formaldehyde and a dialkylamine may be added in amounts by mole greater than three times that of the phenol so as to enhance the reaction rate. In general, formaldehyde and a dialkylamine are used in approximately equimolar amounts. Either an amine or formaldehyde may be used in slight excess. Instead of formaldehyde, a substance capable of generating formaldehyde such as paraformaldehyde may be used. Examples of the dialkylamines include dimethylamine, diethylamine, methylethylamine and the like. These amines may be used singly or in combination of two or more. Any order of addition of the phenol, formaldehyde and dialkylamine can be used. The three starting materials may be simultaneously or successively added or a mixture of any two starting materials previously prepared may be added to the other. Water is ordinarily used as a solvent for the reaction.

The temperature of the Mannich reaction is suitably selected within a range of 10°-80° C. Lower temperatures require a longer reaction time, e.g., it takes about 12 hours when the reaction is conducted at 20° C. On the other hand, higher temperatures are apt to cause volatilization of the dialkylamine or formation of side products. Thus, it is preferable to conduct the reaction at a temperature of 30°-60° C. for 3-6 hours.

As the Mannich reaction proceeds approximately quantitatively, there are produced phenol derivatives having 1 to 3 dialkylaminomethyl groups or a mixture thereof depending on the molar ratio of the phenol used to formaldehyde and a dialkylamine. The compounds of formula (I) thus obtained include, for example, 2-dimethylaminomethylphenol, 2,6-bis(dimethylaminomethyl)phenol, 2,4,6-tris(dimethylaminomethyl)phenol, 2-(dimethylaminomethyl)-6-methylphenol, 2,4,6,-tris(-dimethylaminomethyl)-3-methylphenol, 2-dimethylaminomethyl-4-methylphenol, 2,6-bis(dimethylaminomethyl)-4-methylphenol, phenol derivatives in which the dimethylaminomethyl group of the above compounds is replaced by the diethylaminomethyl group or the methylethylaminomethyl group, and mixtures thereof.

The compound of formula (I) can be isolated from the reaction mixture obtained by the Mannich reaction but the reaction mixture is generally directly polycondensed with an epihalohydrin without isolation. The unreacted amine remaining in the Mannich reaction mixture is also condensed with the epihalohydrin. Other amines including ammonia, monoalkylamines such as methylamine, ethylamine and the like, dialkylamines such as dimethylamine, diethylamine and the like, alkylenediamines such as ethylenediamine, aromatic amines and polyamines such as aniline, toluidine, tolylenediamine and the like, polyalkylenepolyamine such as pentaethylenehexamine, and cyclic amines such as piperazine may be further added for polycondensation with the epihalohydrin. If mixed, the compound of formula (I) should be used in an amount of 50 mole % or more of a total of the amine components, i.e. the compound of formula (I) and ammonia or the above-mentioned amines.

The epihalohydrins useful in the practice of the present invention include epichlorohydrin and epibromohydrin, of which epichlorohydrin is preferred. The epihalohydrin is usable in any amount by mole of greater than 0.5 times that of the amines comprising a major proportion of the compound of formula (I). However, use of the epihalohydrin in too large amount results in a polycondensate having a three-dimensional network structure. Such polycondensate tends to become insoluble in water. Thus, the amount by mole of the epihalohydrin is preferred to be 0.5-2 times that of the total amount of the amines. Though the temperature of the polycondensation reaction is in the range of 10°-90° C., a suitable controllable temperature should be selected within the above range depending on the reactivity of the amine or amines to be reacted with the epihalohydrin. For example, the compound obtained by reacting one mole of phenol with three moles of formaldehyde and three moles of dimethylamine is highly reactive, so that the reaction of this compound with an equimolar amount of an epihalohydrin should be conducted at a temperature below 40° C. In fact, it has been found that when the above amine compound is reacted with an equimolar amount of an epihalohydrin at 35° C. and the reaction is continued for 1.5 hours after addition of the epihalohydrin, a polycondensate with a sufficiently high molecular weight can be obtained. Further, when a reaction product of one mole of phenol with two moles of formaldehyde and two moles of dimethylamine, the condensation should preferably be conducted at 60° C. for about 3 hours. The reaction proceeds exothermically and thus it is preferred to control the reaction temperature by cooling the outside of reactor or by controlling the rate of addition of the epihalohydrin.

The reaction is effected in a suitable solvent. Water is generally used as the solvent for the reaction. The reaction can be stopped by addition of acid to the reaction system when a polymer with a desired degree of polymerization is produced. An acid is generally added when the viscosity of a reaction solution having a polymer concentration of 50% reaches above 1000 cp, preferably above 4000 cp, as measured by the Brookfield viscometer, and there can be obtained a polymer having a high molecular weight satisfactory as a flocculant. Any acids may be usable and mineral acids such as hydrochloric acid, sulfuric acid and the like are usually used.

The thus obtained polycondensate according to the present invention is, of course, a polycondensation reaction product and thus is not a single substance but a mixture of substances having different molecular weights and different structures e.g. different arrangement of the monomers. The polycondensates of the invention are believed to contain recurring units of the following formulae

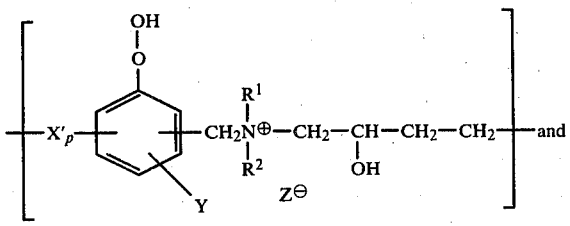
and

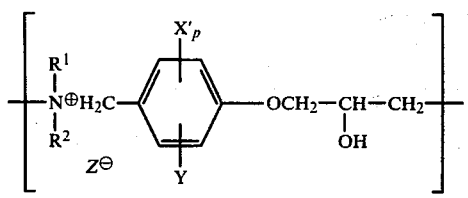

(wherein $R^1$ and $R^2$ are the same or different lower alkyl; Y is a hydrogen or lower alkyl; X' is a dialkylaminomethyl residue; p is 0–2 and $Z^\ominus$ is an anion)

Though exhibiting a flocculation ability in a wide range of a low molecular weight to a high molecular weight, the polymers of the present invention which have a viscosity of about 100 cp, preferably above 1000 cp, with regard to an aqueous 50% polymer solution as measured by means of the Brookfield viscometer are especially effective as the flocculant.

As for the upper limit of the viscosity, any highly viscous polymers are usable unless they lose their solubility in water.

The flocculants according to the invention exhibit very good effects when applied, for example, for removal of mud from river water, for acceleration of settlement of sludge in the sewage treating equipments, for dewatering of such sludge, for treatment of oil-containing effluent derived from the refining processes in the petrochemical industry, for acceleration of filtration of clay on production of cement, for concentration and filtration of porcelain clay slurry in the ceramic industry, for clarification of effluent from porcelain clay-treating processes, for dewatering of concentrate in the mining industry, for clarification of effluent from quarrying processes and also from coal dressing processes, for clarification of effluent from blast furnaces in the iron and steel industry and in the metal-working industry, for removal and settlement of mud from effluent derived from polishing processes, for settling and floating treatments of washings and oil-containing effluent from casting processes using cupola, for retention aid of dry or wet strength resin, drainage aid, for fixation of size, retention aid of pigment and filler in the paper-making industry, clarification of effluent from paper-making processes and dewatering of the resulting sludge, for clarification of effluent from pulp-making processes, for decolorization and clarification of effluent from deinking processes, for flocculation of various effluents in the food industry, for dewatering of excess sludge from biological treatment process as a floating and settling agent for effluent in the dye industry, for clarification of effluent from the washing of gravel or pebbles, for clarification of effluent containing anionic surfactant or detergent, and the like.

In practice the flocculants according to the invention may be used together with other inorganic and/or organic flocculants. Anionic and/or cationic polyacrylamide flocculants may be used in combination with the flocculants of the invention.

The present invention will be illustrated by way of the following examples, which should not be construed as a limitation thereof.

EXAMPLE 1

28.3 g (0.3 moles) of phenol was placed in a separable flask, to which was added 73.0 g (0.9 moles) of an aqueous 37% formalin solution. Then, 81.0 g (0.9 moles) of an aqueous 50% dimethylamine solution was dropped into the flask and the reaction system was maintained at 55° C. The Mannich reaction was conducted for 4 hours with agitation. The resulting product is believed to contain a major proportion of 2,4,6-tris(dimethylaminomethyl)phenol. To the Mannich reaction solution was dropwise added 27.8 g (0.3 moles) of epichlorohydrin in 30 minutes while maintaining the system at 40° C. After completion of the dropping, the agitation was continued at 40° C. and, as a result, the system was gradually rendered viscous. When the reaction solution reached 7000 cp in viscosity 1 hour after dropping, 60.8 g (0.6 moles) of 36% hydrochloric acid was added to stop the polycondensation reaction.

The viscosity of the polycondensation reaction solution at 25° C. was found to be 3750 cp as measured by the Brookfield viscometer.

EXAMPLE 2

28.3 g (0.3 moles) of phenol was placed in a separable flask, to which was added 62.1 g (0.69 moles) of an aqueous 50% dimethylamine solution and then 56.0 g (0.69 moles) of an aqueous 37% formalin solution, followed by effecting the Mannich reaction for 5 hours under agitation while maintaining the system at 40° C. The resulting product is believed to be a mixture of a major proportion of bis(dimethylaminomethyl)phenol and minor proportions of tris(dimethylaminomethyl)phenol and mono(dimethylaminomethyl)phenol. To the Mannich reaction solution was dropwise added 27.8 g (0.3 moles) of epichlorohydrin in 30 minutes under agitation while maintaining the system at 60° C. After completion of the dropping, the reaction solution was further agitated and, as a result, it was gradually rendered viscous. When the viscosity of the solution reached 5000 cp 3 hours after the dropping, 39.2 g (0.2 moles) of 50% sulfuric acid was added to stop the polycondensation reaction.

The polycondensation reaction solution had a viscosity of 1730 cp at 25° C.

EXAMPLE 3

47 g (0.5 moles) of phenol, 121.6 g (1.5 moles) of an aqueous 37% formalin solution and 135 g (1.5 moles) of an aqueous 50% dimethylamine solution was subjected to the Mannich reaction in the same manner as in Example 1. To the reaction system were further added 3 g (0.05 moles) of ethylenediamine, into which was dropped 50.9 g (0.55 moles) of epichlorohydrin in 30 minutes under agitation. The reaction system was maintained at 35° C. during the course of the reaction. The reaction solution was continuously agitated at 35° C. after completion of the dropping and, as a result, it was gradually rendered viscous.

When the viscosity of the solution reached 8000 cp 1 hour after the dropping, 102.9 g (0.525 moles) of 50% sulfuric acid was added to stop the polycondensation reaction. The final polycondensation reaction solution had a viscosity of 4030 cp at 25° C.

EXAMPLE 4

54 g (0.5 moles) of m-cresol was placed in a separable flask, to which were added 135 g (1.5 moles) of an aqueous 50% dimethylamine solution and 121.6 g (1.5 moles) of an aqueous 37% formaline solution to effect the Mannich reaction in the same manner as in Example 1. The principal component of the resulting product is considered to be 2,4,6-tris(dimethylaminomethyl)-3-methylphenol.

To the Mannich reaction solution was dropwise added 41.6 g (0.45 moles) of epichlorohydrin in 30 minutes under agitation while maintaining the system at 40° C. After completion of the dropping, the solution was continuously agitated at 40° C., so that it was gradually rendered viscous. When the viscosity of the solution reached 6500 cp 2 hours after the dropping, 106.5 g (1.05 moles) of 36% hydrochloric acid was added to the system to stop the polycondensation reaction.

The final polycondensation reaction solution had a viscosity of 2950 cp at 25° C.

EXAMPLE 5

48.6 g (0.6 moles) of an aqueous 37% formalin solution was placed in a separable flask, to which were added 43.9 g (0.6 moles) of diethylamine and 32.4 g (0.3 moles) of p-cresol. The system was maintained at 50° C. to effect the Mannich reaction for 5 hours under agitation. It is considered that the principal component of the resulting product is 2,6-bis(diethylaminomethyl)-4-methylphenol.

Then, 27.8 g (0.3 moles) of epichlorohydrin was dropped into the Mannich reaction solution under agitation while maintaining the temperature at 55° C. After completion of the dropping, the reaction solution was continuously agitated at 55° C. As a result, the solution was gradually rendered viscous. When the viscosity of the solution reached 4500 cp 3 hours after the dropping, 25.3 g (0.25 moles) of 36% hydrochloric acid was added to the solution to stop the polycondensation.

The final polycondensate had a viscosity of 1920 at 25° C.

EXAMPLE 6

28.3 g of phenol was placed in a separable flask, to which was added 73.0 g of an aqueous 37% formalin solution. Then, 81.0 g of an aqueous 50% dimethylamine solution was dropped into the mixture, followed by agitating for 4 hours at 55° C. The above process was repeated to give four reaction solutions of the same type. The principal component of these polymers are considered to be 2,4,6-tris(dimethylaminomethyl)-phenol.

Each of the reaction solutions was then reacted with 27.8 g of epichlorohydrin at 40° C. similarly to the foregoing examples in which hydrochloric acid was added to the reaction solutions to stop the reaction at different times. As a result, four polycondensates having different viscosities shown below were obtained.

| Sample No. | Viscosity* (cp) |
| --- | --- |
| 1 | 84 |
| 2 | 330 |
| 3 | 1800 |
| 4 | 3750 |

*The viscosity was measured on an aqueous solution having a polymer concentration of 48.4 % at 25° C. by the use of the Brookfield viscometer.

The polycondensates produced in the foregoing examples and commercially available flocculants are used to conduct the flocculation test.

EXAMPLE 7

The polymers obtained in Example 6 and having different viscosities were each used to treat a mixture of raw sludge and excess sludge from the city sewage (ss: 3.8%, pH: 6.5) to determine a CST value. In the Examples "CST" means "capillary suction time", and "SS" means "suspended solids". The results are shown in Table 1 below.

Table 1

|  | 150 ppm | 200 ppm | 300 ppm | 400 ppm |
| --- | --- | --- | --- | --- |
| Sample No.1 | 124.8 (sec.) | 92.2 (sec.) | 45.8 (sec.) | 32.3 (sec.) |
| Sample No.2 | 86.7 | 40.0 | 20.6 | 15.4 |
| Sample No.3 | 80.1 | 38.8 | 18.2 | 13.9 |
| Sample No.4 | 75.0 | 37.4 | 18.1 | 13.2 |

EXAMPLE 8

A bentonite suspension (0.5%) was prepared in a 200 cc cylinder. After addition of each of following flocculants, the cylinder was agitated by inverting it. An amount of addition of each flocculant required for producing a clear supernatant liquid was determined. The amount of addition of flocculant will be expressed in terms of an amount of effective component herein and whenever it appears hereinlater. The results are shown in Table 2 below.

Table 2

| Flocculants* | Amount of Addition |
| --- | --- |
| Sample (A) | 8 mg |
| Sample (B) | 11 mg |
| Sample (C) | 9 mg |
| Sample (D) | 15 mg |
| Sample (E) | 30 mg |

*Sample A: Product of Example 1
Sample B: Product of Example 2
Sample C: Product of Example 3
Sample D: Polycondensate of dimethylamine and epichlorohydrin (commercially sold product)
Sample E: Polycondensate of dicyandiamide and formaldehyde (commercially sold product)

EXAMPLE 9

Each of flocculants indicated in Table below was added to oil-containing effluent (oil content: 2.8%), and determined a residual oil content. 200 cc of the effluent was placed in a beaker, to which was added each flocculant while agitating by means of a jar tester. After the addition of the flocculant, 1000 ppm of bentonite and 2 ppm of an anionic polyacrylamide were further added, followed by sufficient agitation. When the respective flocculants were added in the same amount (100 ppm), the residual oil contents observed were as follows.

Table 3

| Flocuulant | Residual Oil Content |
| --- | --- |
| Sample (A) | 2 ppm |
| Sample (B) | 5 ppm |
| Sample (C) | 3 ppm |
| Sample (D) | 5 ppm |

EXAMPLE 10

The effluent from a pulp mill (Color by platinum-cobalt method: 1000°, COD: 300 ppm) was treated according to a jar test technique, with the results shown in Table below.

In the treatment, the pH was adjusted at 5 and 2 ppm of an anionic polyacrylamide was used together. In experiment Nos. 3-5, 100 ppm of liquid aluminum sulfate was used in combination. COD means chemical oxygen demand.

| No. | Flocculant | Amount of addition | Color | COD |
| --- | --- | --- | --- | --- |
| 1 | aluminum sulfate (liquid) | 500 ppm | 150° | 100 ppm |
| 2 | Sample (A) | 80 ppm | 170° | 120 ppm |
| 3 | Sample (A) | 10 ppm | 145° | 90 ppm |
| 4 | Sample (B) | 15 ppm | 150° | 100 ppm |
| 5 | Sample (C) | 11 ppm | 145° | 90 ppm |

EXAMPLE 11

200 cc of effluent from washing of gravels having an SS value of 2.0% and a pH of 6.9 was placed in a cylinder. After addition of each flocculant the cylinder was inverted for agitation, to which was further added 5 ppm of an anionic polyacrylamide followed by agitating and then allowing to stand for 5 minutes. The optimum amount of addition of each flocculant required for producing a clear supernatant liquid (turbidity below 20 degrees) is shown in Table below.

Table 5

| Flocculant | Optimum Amount of Addition |
| --- | --- |
| Sample A | 13 ppm |
| Sample B | 15 ppm |
| Sample C | 12 ppm |
| Sample D | 20 ppm |
| Aluminum Sulfate | 200 ppm |

EXAMPLE 12

This example illustrates application of the flocculants of the present invention to paper-making processes. The effect of the flocculant as a retention aid were tested and, as a result, it was found that it exhibited a high rate of retention on wire when used in combination with a Mannich reaction product of polyacrylamide.

Type of Pulp: Ground Pulp 50%, Waste Paper and the like 50%
pH under paper-making conditions: 6.0
Basis Weight: 55 g
TAPPI standard handsheets machine
The test results are shown in Table 6 below.

Table 6

| | Rate of Retention on Wire |
| --- | --- |
| Mannich Reaction Product of Polyacrylamide (0.2%) + Sample (A) (0.05%) | 97% |
| Mannich Reaction Product of Polyacrylamide (0.5%) | 95% |
| No Additive | 90% |

EXAMPLE 13

This example illustrates another example of application to the paper-making industry, i.e. as a retention aid of dry strength resin. The polycondensate of the invention was found to be much higher in effect than known cationic condensate type polymers. The burst factors of paper sheets of a basis weight of 50 g which were made using 100% LBKP (hardwood bleached kraft pulp) with commercially available dry strength resin and the present polycondensate are shown in Table below. The burst factor was measured by Japanese Industrial Standard.

Table 7

| Sample | Amount | 0.1% | 0.2% | 0.3% |
| --- | --- | --- | --- | --- |
| Commercially available dry strength resin | | 3.0 | 3.2 | 3.4 |

| Sample | Amount | 0.01% | 0.02% | 0.03% |
| --- | --- | --- | --- | --- |
| Commercially available dry strength resin(0.1%) + Sample (A) | | 3.1 | 3.3 | 3.5 |
| Commercially available dry strength resin(0.1%) + Sample (D) | | 3.0 | 3.1 | 3.2 |

EXAMPLE 14

An artificial dye effluent (solution containing 300 ppm of Direct Fast Scarlet) was prepared and was treated with each of flocculants together with 500 ppm of bentonite and 2 ppm of an anionic polyacrylamide to obtain a clear supernatant liquid (exhibiting a rate of residual color below 1%). The minimum amount of each flocculant for attaining the above purpose is shown in Table below.

Table 8

| Flocculant | Minimum Amount |
| --- | --- |
| Sample (A) | 22 ppm |
| Sample (B) | 30 ppm |
| Sample (C) | 32 ppm |
| Sample (E) | 100 ppm |

EXAMPLE 15

The polycondensates of the invention are especially effective for treatment of sludge. The polycondensates showed remarkable effects as a dewatering agent or for final settling purpose, which would not be expected in the case of other known condensation type polymers. This is considered due to the specific structure of the polycondensates according to the invention. The settling velocity of sludge flock determined by a cylinder test is shown for different amount of flocculant.

Table 9

| Flocculant | Amount 0 | 5 ppm | 10 ppm | 15 ppm |
| --- | --- | --- | --- | --- |
| Sample (A) | 0.5 cm/min | 10.0 cm/min | 18.3 cm/min | 26.0 cm/min |
| Sample (B) | 0.5 | 9.1 | 16.8 | 20.0 |
| Sample (C) | 0.5 | 10.0 | 20.5 | 28.8 |
| Sample (D) | 0.5 | 8.3 | 13.7 | 18.4 |

Sludge:
Excess sludge from a night-soil treating equipment
SS = 2000 ppm
pH = 6.8

EXAMPLE 16

The polycondensates according to the invention was used for dewatering of sludge and gave good results. Excess sludge (SS=3.2%, pH=6.8) from a sewage-treating facility was used to determine CST values when applied with different amount of flocculants. The test results are shown in Table below.

Table 10

| Flocculant | CST Value (seconds) | | | Amount |
|---|---|---|---|---|
| | 200 ppm | 300 ppm | 400 ppm | 500 ppm |
| Sample (A) | 19.8 | 17.5 | 13.7 | 12.8 |
| Sample (B) | 20.3 | 18.3 | 15.5 | 13.5 |
| Sample (C) | 18.8 | 17.3 | 13.0 | 11.7 |
| Sample (D) | 20.6 | 18.3 | 15.9 | 13.5 |
| Sample (E) | 34.8 | 31.2 | 27.3 | 25.4 |

What is claimed is:

1. A cationic polymer flocculant substantially composed of a water-soluble polycondensate of an epihalohydrin and an amine (a) expressed by the general formula

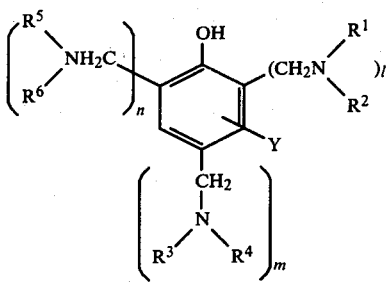

wherein Y represents a hydrogen or a lower alkyl; $R^1$, $R^2$, $R^3$, $R^4$, $R^5$ and $R^6$ are the same or different lower alkyl; l, m and n are 0 or 1 respectively provided that l, m and n are not 0 at the same time; or a mixture of the amine (a) and at least one amine selected from the group (b) consisting of ammonia, monoalkylamines, dialkylamines, alkylenediamines, aromatic amines, polyalkylenepolyamines, and cyclic amines, the amine (a) being contained in an amount of above 50 mole % of the total of the amines (a) and (b).

2. A polymer flocculant according to claim 1, wherein said water-soluble polycondensate is that of an epihalohydrin and the amine (a).

3. A polymer flocculant according to claim 1, wherein said amine (a) comprises a major proportion of a compound expressed by the general formula

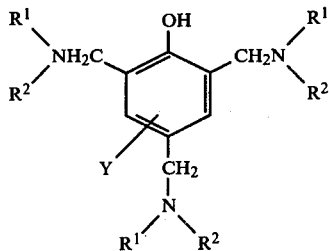

(wherein $R^1$ and $R^2$ independently represent a lower alkyl; Y represent a hydrogen or a lower alkyl).

4. A polymer condensate according to claim 1, wherein said amine (a) comprises a major proportion of a compound expressed by the general formula

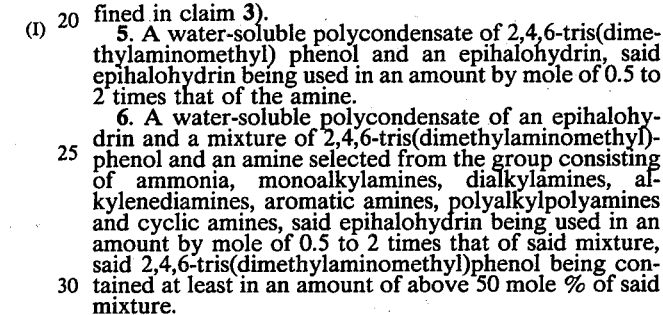

(wherein $R^1$, $R^2$ and Y have the same meanings as defined in claim 3).

5. A water-soluble polycondensate of 2,4,6-tris(dimethylaminomethyl) phenol and an epihalohydrin, said epihalohydrin being used in an amount by mole of 0.5 to 2 times that of the amine.

6. A water-soluble polycondensate of an epihalohydrin and a mixture of 2,4,6-tris(dimethylaminomethyl)-phenol and an amine selected from the group consisting of ammonia, monoalkylamines, dialkylamines, alkylenediamines, aromatic amines, polyalkylpolyamines and cyclic amines, said epihalohydrin being used in an amount by mole of 0.5 to 2 times that of said mixture, said 2,4,6-tris(dimethylaminomethyl)phenol being contained at least in an amount of above 50 mole % of said mixture.

7. A process for producing a cationic polymer flocculant comprising interacting (1) phenol or cresol, (2) formaldehyde or a substance capable of generating formaldehyde, and a dialkylamine having an alkyl radical containing 1-2 carbon atoms, and adding to the resulting reaction product an epihalohydrin and, if desired, small amount of an amine or ammonia for polycondensation reaction to obtain a water-soluble polycondensate.

8. A process according to claim 7, wherein formaldehyde or the substance capable of generating formaldehyde (2) and the dialkylamine (3) are each used in an amount of 1-3 moles per/mole of phenol or cresol (1).

9. A process according to claim 7, wherein a reaction product of phenol, formaldehyde and dimethylamine is polycondensated with an epichlorohyrin.

10. A process for flocculating flocculatable industrial effluent which comprises adding to the effluent an effective amount of flocculant essentially composed of water-soluble polycondensates of epihalohydrin and an amine (a) having the general formula (I)

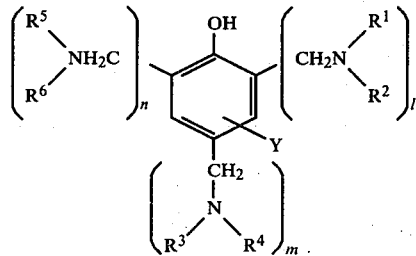

wherein Y represents a hydrogen or a lower alkyl; $R^1$, $R^2$, $R^3$, $R^4$, $R^5$ and $R^6$ are the same or different lower alkyl; l, m and n are 0 or 1 respectively, proviso that l, m and n are not 0 at the same time; or a mixture of the amine (a) and at least one selected from the group (b) consisting of ammonia, monoalkylamines, dialkylamines, alkylenediamines, aromatic amines, polyalkylenepolyamines and cyclic amines, the amine (a) being contained in an amount of above 50 mole % of the total of the amines (a) and (b).

* * * * *